(12) United States Patent
Zidar et al.

(10) Patent No.: US 7,829,201 B2
(45) Date of Patent: Nov. 9, 2010

(54) PLAIN BEARING

(75) Inventors: Jakob Zidar, Altmuenster (AT); Werner Schubert, Wiesloch-Baiertal (DE); Megjit Seremeti, Papenburg (DE)

(73) Assignees: Miba Gleitlager GmbH, Laakirchen (AT); KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 12/001,871

(22) Filed: Dec. 13, 2007

(65) Prior Publication Data

US 2008/0152942 A1    Jun. 26, 2008

(30) Foreign Application Priority Data

Dec. 13, 2006   (AT)   ............... A 2052/2006

(51) Int. Cl.
*B32B 15/01*    (2006.01)
*B32B 15/18*    (2006.01)
*F16C 33/02*    (2006.01)

(52) U.S. Cl. ................ 428/658; 428/659; 428/681; 384/129; 384/907; 384/912

(58) Field of Classification Search ............ None
See application file for complete search history.

(56) References Cited

U.S. PATENT DOCUMENTS

| | | | |
|---|---|---|---|
| 6,045,929 A | 4/2000 | Eastham et al. | |
| 6,465,114 B1 * | 10/2002 | Honda et al. | 428/659 |
| 6,492,039 B2 | 12/2002 | Huhn et al. | |
| 2002/0192390 A1 | 12/2002 | Hartig et al. | |
| 2003/0012977 A1 * | 1/2003 | Mergen | 428/650 |
| 2004/0136860 A1 | 7/2004 | Fujita et al. | |
| 2007/0031651 A1 * | 2/2007 | Kagohara et al. | 428/323 |
| 2008/0187260 A1 * | 8/2008 | Schubert et al. | 384/294 |

FOREIGN PATENT DOCUMENTS

| | | | |
|---|---|---|---|
| AT | CH 492 791 | | 8/1966 |
| DE | 199 63 385 C1 | | 1/2001 |
| DE | 100 32 624 C2 | | 4/2001 |
| DE | 102005001537 | * | 5/2006 |
| DE | 102005045701 | * | 3/2007 |
| WO | WO 96/15382 | | 5/1996 |

* cited by examiner

*Primary Examiner*—Jennifer C McNeil
*Assistant Examiner*—Jason L Savage
(74) *Attorney, Agent, or Firm*—Collard & Roe, P.C.

(57) ABSTRACT

A plain bearing is described having a bearing metal layer, supported by a support shell, made of an aluminum or copper alloy and having a lead-free running layer, possibly applied to the bearing metal layer over an intermediate layer, made of a zinc matrix having at least one further alloy element. To achieve good tribological properties, it is suggested that the zinc matrix of the running layer contains 1 to 49 wt.-% bismuth as an additional alloy element.

9 Claims, No Drawings

PLAIN BEARING

CROSS REFERENCE TO RELATED APPLICATIONS

Applicants claim priority under 35 U.S.C. §119 of Austrian Application No. A 2052/2006 filed Dec. 13, 2006.

FIELD OF THE INVENTION

The present invention relates to a plain bearing having a bearing metal layer, supported by a support shell, made of an aluminum or copper alloy and having a lead-free running layer, possibly applied to the bearing metal layer via an intermediate layer, made of a zinc matrix having at least one further alloy element.

DESCRIPTION OF THE PRIOR ART

Running layers of plain bearings containing lead have the disadvantage of toxicity because of the lead content on one hand and are subject to wear because of the low hardness caused by the lead component on the other hand. The attempts to develop lead-free running layers are therefore frequently linked to efforts toward a reduced tendency to wear. Thus, inter alia, it has been suggested that a tin matrix be used for the running layer, in which tin-copper particles are intercalated (DE 199 63 385 C1). Neglecting the fact that in spite of the intercalation of the harder tin-copper particles in the soft tin matrix, the wear properties cannot meet higher demands, the temperature resistance of such running layers is also comparatively low.

The attempts to use bismuth or bismuth alloys for the running layer of a plain bearing generally fail because of the brittleness of the bismuth. Even the suggestion of taking an appropriate influence on the hardness and brittleness of bismuth through a specific orientation of the bismuth crystals (DE 100 32 624 C2) did not result in decisive improvements of the bearing properties in comparison to plain bearings having corresponding lead components.

Finally, a plain bearing having a support shell, having a bearing metal layer based on aluminum or copper, and having a running layer was suggested (WO 96/15382 A1), which has a zinc matrix having 0.5 to 25 wt.-% of at least one additional alloy element from a group of alloy elements containing nickel, cobalt, and iron. Although a significant increase of the wear resistance was able to be achieved using such plain bearings, they are unsuitable for most applications because of the high affinity of the zinc to steel, however.

SUMMARY OF THE INVENTION

The present invention is thus based on the object of designing a plain bearing of the type described at the beginning in such a way that good tribological properties may be linked to a high wear resistance.

The present invention achieves the stated object in that the zinc matrix of the running layer contains 1 to 49 wt.-% bismuth as an additional alloy element.

It has surprisingly been shown that by the addition of bismuth, good tribological properties may be ensured for the running layer, having a low tendency to abrasion in comparison to zinc in spite of the zinc matrix. In addition, a ductile running layer is obtained, although bismuth per se is to be viewed as brittle. This is decisively significant for the running-in behavior of the plain bearing and the dirt embedding capability, particularly because the fatigue strength is increased. A bismuth content of 1 wt.-% already shows a significant influence on the tribological properties of the running layer. Especially advantageous effects result at a bismuth content of greater than 4 wt.-%, preferably greater than 10 wt.-%. The bismuth proportion must have an upper boundary, however, to restrict the influence of the bismuth on the brittleness of the running layer. Although a bismuth proportion up to 49 wt.-% is possible for special applications, in general the bismuth proportion will not exceed 40 wt/-%, preferable 30 wt/-%.

In principle, zinc alloys having lead or cadmium added may also be used for running layers of a plain bearing, but the toxicity of these alloy additives opposes such a use. Zinc alloys having tin or indium as the main alloy additives also have sufficient tribological properties, but the temperature resistance is limited. Running layers based on zinc having silver as the main alloy additive have good running properties, but silver forms hard intermetallic phases with zinc.

The hardness and, as a function thereof, the wear resistance of the running layer or the corrosion resistance may be adjusted by further alloy elements. For this purpose, the zinc matrix may contain, in addition to bismuth, at least one further alloy element from a group of alloy elements comprising iron, cobalt, copper, manganese, nickel, silver, tin, antimony, titanium, chromium, molybdenum, and tungsten, the individual proportion of these alloy elements making up 0.01 to 15 wt.-%, the total proportion being at most 20 wt.-%, however. So as not to endanger the tribological properties of the zinc-bismuth alloy of the running layer, the use of additional alloy elements is to be limited to a total proportion, the specified lower limit of the content of additional alloy elements being necessary to be able to take a corresponding influence on the particular property to be considered. The individual proportion of the alloy elements will preferably lie between 0.1 and 10 wt.-%, in particular between 0.3 and 5 wt.-%.

Of this group of alloy elements, the subgroup made up of iron, cobalt, and copper will preferably be used for reinforcing the zinc matrix, the corrosion resistance also being increased, with the exception of copper. The alloy elements of this subgroup are to make up a total proportion of 0.2 to 3 wt.-%, the individual proportion of the alloy elements being between 0.02 and 3 wt.-%. A noticeably increased corrosion resistance may be achieved by an iron proportion of 0.3 to 1 wt.-%. Increased iron content results in an increase of the hardness, but running layers having an iron proportion of 6 to 15 wt.-% are still sufficiently deformable. Typical cobalt contents are between 0.5 and 2 wt.-% and increase the corrosion resistance to sulfur dioxide above all. Copper is soluble in the zinc matrix up to approximately 1 wt.-%, without forming precipitants. An increase of the tensile strength with nearly unchanged deformability may be observed in this range of the copper content. Precipitants form when the copper content rises above 1 wt.-%, which is connected to a drop of the deformability and a simultaneous increase of the hardness.

In addition to these alloy elements, others of the specified elements may also be used to be able to influence particular properties. Thus, manganese dissolved in zinc provides a significant improvement of the mechanical properties of the running layer. Because manganese is soluble in zinc up to approximately 0.3 wt.-%, a manganese proportion of 0.01 to 0.3 wt.-% may be provided for this purpose. At higher manganese contents, properties come to bear which improve the corrosion resistance. However, the formation of a bismuth-manganese phase must be expected from manganese contents of 12 to 17 wt.-%, by which the soft phase component is reduced.

Nickel forms intermetallic phases with both zinc and also bismuth. Because the intermetallic phases with zinc are more stable than those with bismuth, however, sufficient ductility of the running layer may also be ensured at higher nickel contents, which increase the corrosion resistance. At nickel contents below 0.05 wt.-%, very fine precipitants form in zinc matrix, which improve the strength of the running layer.

To reduce the tendency to seize, silver may be alloyed, which is soluble up to 2.5 wt.-% in zinc matrix. For this purpose, a content of 0.1 to 1 wt.-% is preferably provided. Silver contents above 2.5 wt.-% result in precipitants which increase the hardness and wear resistance. Free tin forms an alloy having a very low melting point with zinc. Tin is soluble in zinc up to a content of 0.02 wt.-% and improves the corrosion resistance of the running layer in a proportion range of 0.01 to 0.02 wt.-%. Antimony acts to increase the strength in the zinc matrix by forming a phase with bismuth, in particular in the even of higher contents of additional alloy elements, such as iron, cobalt, or copper. For this purpose, antimony proportions between 0.05 and 5 wt.-% are required. Titanium may be used to improve the wear resistance of the zinc matrix at contents between 0.1 and 0.5 wt.-%. To increase the strength of the running layer, chromium may also be used, up to a content of 0.02. wt.-%. Chromium is soluble in zinc matrix up to this content. Higher chromium proportions improve the corrosion resistance, the zinc matrix maintaining sufficient ductility up to a chromium content of 10 wt.-%. Molybdenum has an effect similar to chromium in the zinc matrix, but additionally inhibits the hydrogen formation in zinc electrolytes, so that the danger of embrittlement by hydrogen may be effectively countered. Tungsten is insoluble in both zinc and also bismuth and acts as a third phase in the meaning of precipitation hardening. Especially at contents of approximately 1 wt.-%, a noticeable increase of the wear resistance may be achieved.

In a known way, good dirt embedding capability during a running-in phase and a wear resistance which becomes greater with increasing wear may be achieved by a composition of the running layer alloy changing over the thickness of the running layer. For this purpose, it only has to be ensured that the soft phase proportion increases toward the running phase, but the hard phase proportion increases toward the bearing metal layer. To allow especially advantageous running-in conditions, the running layer may be covered by a running-in layer made of bismuth, which is abraded during the running-in phase, so that after the running-in phase a low-wear running layer comes into effect, in which the dirt embedding capability no longer plays a decisive role. It probably does not need to be emphasized in this context that the properties of the plain bearing may be tailored to specific requirements by additional intercalation of harder particles in the zinc matrix of the running layer. Such harder particles, made of titanium oxide or a zinc-copper phase, for example, accumulate at the grain boundaries, so that the grain boundary diffusion and thus the grain coarsening are prevented, which results in tribological properties of the plain bearing which remain uniform over its service life. Aluminum, zirconium, or silicon oxide, silicon or boron carbide, aluminum nitride, and mixed oxides, preferably having a diameter of 50 to 500 nm, may be used as harder particles. The volume proportion of these particles is preferably 0.1 to 20. The incorporation of harder particles in the zinc matrix may strongly reduce the wear rate even with practically unchanged hardness. This may possibly be attributed to the polishing effect of these harder particles on the body to mounted. Harder particles having a grain size less than 100 nm additionally provide the effect of dispersion hardening.

If an aluminum alloy is used as the bearing metal layer, the running layer may be applied directly to the aluminum alloy having an adhesion promoting layer applied from a zincate bath. A corresponding addition of zinc to the aluminum alloy is recommended to reduce a diffusion of the zinc into the aluminum alloy. Bearing metal layers based on copper alloys generally require an intermediate layer to suppress zinc migration into the bearing metal layer. For example, alloys based on zinc-nickel, zinc-iron, tin-nickel, copper-tin, copper-zinc, copper-zinc-tin, zinc-cobalt, tin-cobalt, tungsten-nickel, molybdenum-nickel, and palladium-nickel are suitable as intermediate layers, the thickness of the intermediate layer preferably being between 1 and 3 µm. However, intermediate layers made of silver, gold, platinum, antimony, palladium, or chromium may also be used, for example.

EXAMPLE 1

In a plain bearing having a steel support shell and a bearing metal layer made of a brass alloy, a multilayer running layer is applied, the running layer ply on the bearing metal side having 10 wt.-% bismuth, 3 wt.-% iron, 1 wt.-% cobalt, and the remainder zinc with unavoidable contaminants. The hardness of this running layer ply is 130 HV, and the thickness is 5 µm. The bismuth proportion was increased to 20 wt.-% in the middle running layer ply, the hardness sinking to 70 HV at an iron proportion of 1.2 wt.-% and a cobalt proportion of 0.8 wt.-%. Finally, the uppermost layer had a bismuth proportion of 30 wt.-%, an iron proportion of 0.5 wt.-%, and a cobalt proportion of 0.3 wt.-% at a hardness of 40 HV. This ply was covered by a running-in layer made of bismuth having a thickness of 3 µm and a hardness of 18 HV.

EXAMPLE 2

With a running layer, applied to an aluminum alloy, having a bismuth proportion of 30 wt.-% and a copper proportion of 0.5 wt.-%, the remainder zinc with unavoidable contaminants, additional titanium oxide particles were intercalated in the zinc matrix in a quantity of 0.8 wt.-%, a hardness of 35 HV being achieved. The average grain size of the titanium oxide particles was 0.2 µm.

EXAMPLE 3

In a further exemplary embodiment, a copper-tin-zinc alloy having a hardness of 180 HV was used as the bearing metal layer, to which an intermediate layer made of a zinc-nickel alloy having 12 wt.-% nickel was applied in a thickness of 2 µm (hardness 550 HV) as a diffusion barrier. The running layer was deposited in a thickness of 15 µm and contained a bismuth proportion of 30 wt.-% as well as a proportion of 3 wt.-% cobalt and 0.2 wt.-% nickel, the remainder being zinc with unavoidable contaminants. The hardness of this running layer was 50 HV. A running-in layer of 3 µm made of bismuth was provided to improve the running-in behavior.

To monitor the wear behavior, on one hand plain bearings according to the present invention according to Examples 1 through 3 and on the other hand known plain bearings were subjected to corresponding testing conditions, the changing dynamic load being increased step-by-step to 80 MPa at a running speed of 13.2 m/s (6000 rpm) and then being maintained over a period of time of 25 hours. The temperature of the supplied lubricant oil 5W-40SE was 130° C.

The seizure load limit, i.e., the load at which seizing occurred between the running layer of the plain bearing and the shaft, and the wear occurring in the form of the abraded layer thickness were measured. In addition, the hardness of the running layer in the metallographic cross-section was ascertained using a microhardness tester from Vickers. This hardness correlated well with the dirt embedding capability, which decreased with increasing hardness. The temperature resistance, which was also ascertained, essentially corresponded to the (eutectic) melting temperature which be read from the phase diagram. The detected values are summarized in the following table, the results for the bearings according to Examples 1 through 3 being specified in lines 1 through 3. Line 4 relates to a plain bearing having a bearing metal layer made of leaded bronze having a running layer based on lead deposited on the nickel intermediate layer. The values in line 5 are from a plain bearing having a bearing metal layer based on brass having a running layer based on tin and an intermediate layer made of nickel. The test results for the bearing having a bearing metal layer based on brass, an intermediate layer made of silver, and a running layer made of bismuth are summarized in line 6. Finally, the results for a plain bearing having a bearing metal layer based on brass, an intermediate layer made of the nickel-zinc alloy, and a running layer made of zinc are reproduced in line 7.

| | Running layer | Seizure Load Limit (MPa) | Wear (μm) | Hardness (HV) | Temperature (° C.) |
|---|---|---|---|---|---|
| 1 | ZnBiFeCo, multilayer runnning-in layer Bi | >80 | 8 | 40-130 18 | 255 |
| 2 | ZnBi30Cu0,5TiO$_2$ | >80 | 2 | 35 | 255 |
| 3 | ZnBi30Co3Ni0.2 running-in layer Bi | >80 | 5 | 50 18 | 255 |
| 4 | PbSn15Cu3 | >80 | 18 | 16 | 280 |
| 5 | SnCu5 | >80 | 16 | 23 | 227 |
| 6 | Bi | >80 | 19 | 18 | 271 |
| 7 | Zn | | 10 | 45 | 419 |

The invention claimed is:

1. A plain bearing having a bearing metal layer made of an aluminum or copper alloy supported by a support shell and having a lead-free running layer made of a zinc matrix comprising 31 to 99 wt.-% zinc and having at least one further alloy element, wherein the zinc matrix of the running layer contains 1 to 49 wt.-% bismuth as the additional alloy element.

2. The plain bearing according to claim 1, wherein the zinc matrix of the running layer contains 4 to 40 wt.-% bismuth.

3. The plain bearing according to claim 1, wherein the zinc matrix contains, in addition to bismuth, at least one further alloy element from a group of alloy elements comprising iron, cobalt, manganese, copper, nickel, silver, tin, antimony, titanium, chromium, molybdenum, and tungsten, the individual proportion of these alloy elements making up 0.01 to 15 wt.-%, but the total proportion being at most 20 wt.-%.

4. The plain bearing according to claim 3, wherein the individual proportion of the alloy elements from the group of alloy elements comprising iron, cobalt, manganese, copper, nickel, silver, tin, antimony, titanium, chromium, molybdenum, and tungsten is between 0.1 and 10 wt.-%.

5. The plain bearing according to claim 3, wherein the at least one alloy element from the subgroup of alloy elements is at least one of iron, cobalt, and copper and the proportion of the subgroup is at least 0.2 wt.-%, but at most 3 wt. %, the individual proportion of each alloy element in the subgroup being between 0.02 and 3 wt-%.

6. The plain bearing according to claim 3, wherein the individual proportion of the alloy elements from the group of alloy elements comprising iron, cobalt, manganese, copper, nickel, silver, tin, antimony, titanium, chromium, molybdenum, and tungsten is between 0.3 and 5 wt.-%.

7. The plain bearing according to claim 1, wherein the running layer is covered by a running-in layer made of bismuth.

8. The plain bearing according to claim 1, further comprising an intermediate layer between the bearing metal layer and the lead-free running layer.

9. The plain bearing according to claim 1, wherein the zinc matrix of the running layer contains 10 to 30 wt.-% bismuth.

* * * * *